United States Patent
Rasmussen (10) Patent No.: US 6,640,334 B1
(45) Date of Patent: *Oct. 28, 2003

(54) METHOD AND APPARATUS OF REMOTELY UPDATING FIRMWARE OF A COMMUNICATION DEVICE

(75) Inventor: John H. Rasmussen, Ottawa (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,095

(22) Filed: Sep. 27, 1999

(51) Int. Cl.[7] .................................. G06F 9/44

(52) U.S. Cl. ............... 717/171; 717/169; 717/172; 717/173; 717/175; 717/176; 717/177; 717/178

(58) Field of Search ............... 717/11, 168–173, 717/169, 175, 177, 178, 176; 709/221; 713/1–2

(56) References Cited

U.S. PATENT DOCUMENTS

| | | | |
|---|---|---|---|
| 5,268,928 A | 12/1993 | Herh et al. | 375/8 |
| 5,414,751 A | 5/1995 | Yamada | 379/58 |
| 5,418,524 A | 5/1995 | Fennell | 340/825.22 |
| 5,781,921 A | 7/1998 | Nichols | 711/115 |
| 5,787,288 A * | 7/1998 | Nagata et al. | 717/173 |
| 5,812,857 A * | 9/1998 | Nelson et al. | 709/221 |
| 5,822,692 A | 10/1998 | Krishan et al. | 455/419 |
| 5,878,256 A * | 3/1999 | Bealkowski et al. | 711/103 |
| 5,937,198 A * | 8/1999 | Nelson et al. | 713/1 |
| 6,055,632 A * | 4/2000 | Deegan et al. | 709/221 |
| 6,073,207 A * | 6/2000 | Ideta | 711/103 |
| 6,141,795 A * | 10/2000 | Laugner | 717/170 |
| 6,253,281 B1 * | 6/2001 | Hall | 711/103 |
| 6,275,931 B1 * | 8/2001 | Narayanaswamy et al. | 711/4 |

OTHER PUBLICATIONS

IBM Technical Disclosure Bulletin, "Support of Multiple Initial Microcode Load Images on Personal Computer Reference Diskettes", vol. 36, No. 10, pp. 47–54, Oct. 1993.*

IBM Technical Disclosure Bulletin, "Update Mechanism for Personal Computer System Resident Firmware", vol. 34, No. 10B, pp. 133–136, Mar. 1992.*

IBM Technical Disclosure Bulletin, "Dual Indirect Ram/Rom JUMP Tables for Firmware Updates", vol. 31, No. 1, pp. 294–298, Jun. 1988.*

* cited by examiner

Primary Examiner—Gregory Morse
Assistant Examiner—Ted T. Vo
(74) Attorney, Agent, or Firm—Kent Daniels; Ogilvy Renault (57) ABSTRACT

A method and apparatus for remotely updating firmware saved in a FLASH memory of a communication device connected to a network is presented. The FLASH memory is partitioned into at least a first and a second portion. A first firmware load is stored in the first portion. During run-time of the first firmware load, at least a portion of an updated firmware load is transmitted through the network to the communication device. The transmitted portion of the updated firmware load is temporarily stored in a buffer of the communication device. At least a portion of the first firmware load is copied into a random access memory (RAM) of the communication device. Execution, from the RAM, of the copied portion of the first firmware load is triggered. Under control of the copied portion of the first firmware load, the transmitted portion of the updated firmware load is saved to the second portion of the FLASH memory.

46 Claims, 10 Drawing Sheets

METHOD AND APPARATUS OF REMOTELY UPDATING FIRMWARE OF A COMMUNICATION DEVICE

TECHNICAL FIELD

The present invention relates to data communication devices, and in particular to a method of remotely downloading firmware to a communication device (e.g. a modem) through a communication network.

BACKGROUND OF THE INVENTION

The provision of data communication services (e.g. Internet, XDSL etc.) necessarily requires the installation of a communication device (e.g. a modem connected to a host personal computer—PC) at an end-user site. Typically, the end-user is provided with a communications application (e.g. a browser) running on the host PC to control data communication sessions using a graphical user interface (GUI). The communications application interacts with the installed communication device using a high level Application Program Interface (API) to access firmware governing the low-level functionality of the communication device. Such firmware is commonly saved in a FLASH memory during manufacture of the communication device, and is run from the FLASH memory.

As in other areas of the software industry, firmware applications are not static. Rather, development is an on-going process of improving algorithms and code to enhance the reliability and functionality of the communication device. However, while updated firmware applications can easily be loaded into new communication devices at the factory, it is difficult to provide upgrade loads to communication devices which have been already sold and delivered to the customer.

U.S. Pat. No. 5,268,928 (Herh, et. al.) teaches a data modem with remote firmware update capabilities. According to Herh et al., the data modem is provided with a read only memory (ROM), and a battery-backed random access memory (RAM). The firmware is divided into a boot-logic which is saved in the ROM, and application logic which is stored in the battery-backed RAM. Update loads of the application logic can be downloaded to the modem during normal operation of the device and stored in the battery-backed RAM. Herh et al. require that the modem be provided with two separate memories, and further require that the data modem have additional circuitry (including a built-in battery) to ensure that the application logic is not lost when the modem is turned off. This increases the cost and complexity of the data modem. Another disadvantage of the data modem taught by Herh et al. is that the boot logic (which enables the data modem to perform its basic functions) are stored in the ROM, and thus cannot be updated during the life of the data modem.

It is preferable to store the firmware (both boot and application logic) in a FLASH memory, which is a non-volatile form of programmable memory. One of the advantages of saving the firmware in FLASH memory is that no special equipment is required to write data to the FLASH memory. The circuitry already provided on the device for normal read/write operations is sufficient. Because the FLASH memory can be used for both read and write operations, is it convenient to run the firmware from the FLASH-memory, which minimizes the requirement for RAM. Furthermore, the FLASH memory retains its information after loss of power, so battery-backup circuits are not required.

FLASH memory is readily available in standard sizes (e.g. 128 kb), and, depending on the addressing limitations of the microprocessor of the communication device, may be logically divided into frames or pages (e.g. of 32 kb each). Typically, each page can be enabled (i.e. accessed for reading or writing data) individually by the microprocessor by means of an appropriate page-select signal applied to one or more page-select input pins on the FLASH memory chip. Each page is further subdivided into individually accessible blocks, which can be accessed by the microprocessor by applying appropriate address-select signals to address-select input pins on the FLASH memory chip. Conveniently, corresponding blocks of every page can be accessed using a common address-select signal, so that any desired block on any page of the FLASH memory can be uniquely accessed by applying appropriate page-select and address-select signals (in combination) to the page-select and address-select input pins of the FLASH memory chip.

During operation of the communication device, the microprocessor holds one page in enabled condition (by holding the page select signal constant), and then reads firmware application logic from blocks of the enabled page by changing the address-select signal (either incrementally or in response to jump commands embedded in application logic). Since a single address-select signal can access a corresponding block of memory on each page, changing the page-select signal (thereby enabling another page) during execution of the application logic will very likely cause erroneous operation of the communication device as the microprocessor attempts to execute the contents of a block of FLASH memory which is located on a page other than the page containing the application logic. As a safety measure to prevent this occurrence, firmware applications are typically written in such a way as to prevent the microprocessor from enabling any other page of the FLASH memory while any portion of the application logic is being run.

It is not possible to write information to a portion of the FLASH memory, while reading information from that same portion of FLASH memory. Thus when the modem is in operating mode, the firmware application is being run (therefore also read) from the FLASH memory, and it is not possible to write an updated firmware load to the FLASH memory. Where the FLASH memory is divided into pages, then during operation of the modem the page which contains the firmware application (or that part of it which is running at that time) is necessarily being held in enabled condition, which precludes saving an updated firmware load to any other page of the FLASH memory.

As a result of the above-noted problems, the method of Herh et al. cannot be used in a data modem in which the firmware is stored in a FLASH memory.

Two other methods are known for updating modem firmware. The first of these is exemplified by U.S. Pat. No. 5,781,921 (Nichols), wherein the updated software is distributed in a removable memory device (e.g. a floppy diskette, or a memory cartridge adapted to connect to the modem). Once the removable memory device has been coupled to the modem, the updated firmware is installed under software control. The second method, which is commonly used in the software industry, requires the end user to download the updated firmware load over the communication network, and then subsequently install the updated load under software control.

Both of these methods have certain drawbacks. The use of a removable memory device is expensive, because copies of the device must be either distributed to each user (and used only once), or service technicians must be hired to perform the upgrade. Downloading updated software (e.g. through the Internet) is commonly used as a means of distributing software updates, but requires intervention by the user. Each of these methods is undesirable because each creates inconvenience for the user. Because of the inconvenience, many users will not attempt to upgrade the firmware unless forced to do so because of problems using the modem, which means that the user is already experiencing dissatisfaction with the modem. Additionally, the manufacturer of the modem is forced to rely on others to distribute and install the update loads, and thus cannot be confident that all customers' modems are operating with the latest firmware.

There therefore remains a need for a method of updating firmware of a communication device, under remote control and with minimum disruption to the user.

SUMMARY OF THE INVENTION

It is an object of the invention to provide a method of remotely updating firmware saved in FLASH memory, with minimum user-perceivable disruption in the operation of the communication device.

It is a further object of the present invention to provide a method of remotely updating firmware saved in FLASH memory, in which operation of the communication device is protected in the event of a failure during an attempted update operation.

Accordingly, an aspect of the present invention provides a method of remotely updating firmware saved in a FLASH memory of a communication device connected to a network, the FLASH memory being partitioned into at least a first and a second portion, a first firmware load being stored in the first portion, the method comprising the steps of, during run-time of the first firmware load: transmitting at least a portion of an updated firmware load through the network to the communication device; temporarily storing the transmitted portion of the updated firmware load in a buffer of the communication device; copying at least a portion of the first firmware load into a random access memory (RAM) of the communication device; triggering execution of the copied portion of the first firmware load from the RAM; and under control of the copied portion of the first firmware load, saving the transmitted portion of the updated firmware load to the second portion of the FLASH memory.

A further aspect of the present invention provides a system for remotely updating firmware saved in a FLASH memory of a communication device connected to a network, the FLASH memory being partitioned into at least a first and a second portion, a first firmware load being stored in the first portion, the system comprising: a server operatively connected to the network and adapted for transmitting at least a portion of an updated firmware load through the network to the communication device; a buffer for temporarily storing the transmitted portion of the updated firmware load; and a microprocessor operative under control of the first firmware load to: copy at least a portion of the first firmware load into a random access memory (RAM) of the communication device; trigger execution of the copied portion of the first firmware load from the RAM; and save the transmitted portion of the updated firmware load to the second portion of the FLASH memory under control of the copied portion of the first firmware load.

A still further aspect of the present invention provides a communication device connected to a network and operative in accordance with firmware saved in a FLASH memory of a communication device, the FLASH memory being partitioned into at least a first and a second portion, a first firmware load being stored in the first portion, the communication device being adapted to enable remote update of the firmware through the network, and comprising: a buffer for temporarily storing a received portion of an updated firmware load; and a microprocessor operative under control of the first firmware load to: copy at least a portion of the first firmware load into a random access memory (RAM) of the communication device; trigger execution of the copied portion of the first firmware load from the RAM; and save the received portion of the updated firmware load to the second portion of the FLASH memory under control of the copied portion of the first firmware load.

In accordance with the present invention, the firmware includes program code responsive to commands received from the manufacturer to begin an update procedure. The update procedure controls the communication device to perform the above-noted steps, substantially without interrupting user-initiated communication sessions.

In an embodiment of the invention, the FLASH memory is divided into a Boot Page, and at least a First and a Second Update Pages. A "boot" version of the firmware is installed in the Boot Page at the factory, and is never updated. Updated firmware loads are saved only in the First and Second Update Pages. Accordingly, if a subsequent attempt to update the firmware fails, at least the "boot" version of the firmware will remain in uncorrupted condition, and can be used for operation of the communication device. Similarly; successive updates of the firmware are alternately saved in the first and second Update Pages, so that if an attempted update of the firmware fails, the next most recently updated version of the firmware remains uncorrupted and is available for use. An Active Page Flag is stored in the FLASH memory to identify which of the First and Second Update Pages contains the most up-to-date version of the firmware.

In accordance with the present invention, after completion of the update procedure, the updated version of the firmware becomes active upon a subsequent reboot of the communication device. In one embodiment, this is accomplished by the user during their normal use of the communication device: that is, by powering down and later re-booting their PC. In an alternate embodiment, communication device reboot can be accomplished automatically as a final step in the update procedure. Automatic reboot is particularly suitable with xDSL communication devices, because the reboot will generally take less that one or two seconds, and the communication device will automatically re-establish its connection with the CO. The CO will detect the brief interruption in the connection, but will not disconnect any ongoing communication sessions (due to its short duration). Thus the communication device can be rebooted with the updated firmware without disrupting any communication sessions of the user. Depending on the type and data traffic of the communication session being engaged in, the user may not even be aware that the reboot has taken place.

BRIEF DESCRIPTION OF THE DRAWINGS

The invention will now be explained by way of example only and with reference to the following drawings, wherein.

DETAILED DESCRIPTION OF THE PREFERRED EMBODIMENT

Figure 1:
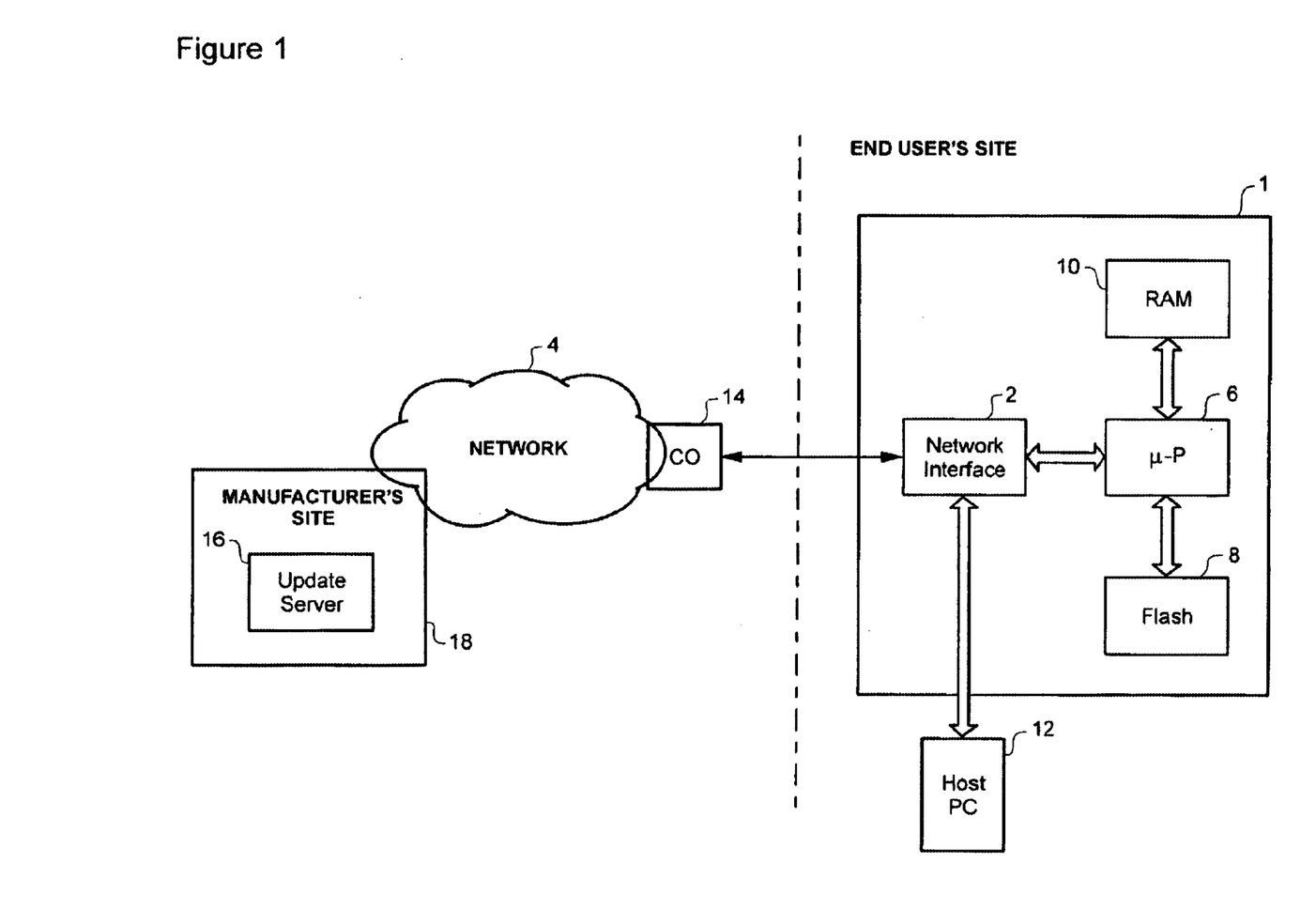
FIG. 1 is a schematic diagram illustrating a communication device, and its connection to an update server at a manufacturer's site in accordance with an embodiment of the present invention.

As shown in FIG. 1, a communication device 1 usable with the present invention comprises a network interface 2 for interfacing with the network 4, a microprocessor 6 for controlling the operation of the communication device 1; a FLASH memory 8 for storing firmware; and RAM 10 used for storing run-time data as well as up-stream and down stream communication buffers (not shown). In the illustrated embodiment, the communication device 1 is operatively connected to a host computer 12 via the network interface 2. In use, the microprocessor 6 operates in accordance with the firmware to provide the functionality of the communication device 1 (e.g. to transport information between the host computer 12 and the network 4).

The communication device 1 is operatively connected to a central office (CO) 14 providing access to the network 4 in a conventional manner. Communications sessions can therefore be established between the communication device 1 and other devices connected to the network 4 (with the communication device 1 initiating or terminating communication sessions), again in a conventional manner. In FIG. 1, an update server 16 at a manufacturer's site 18 is connected to the network 4 (in a conventional manner) and is capable of initiating a communication session with the communication device 1 as will be described in greater detail below.

Figure 2:
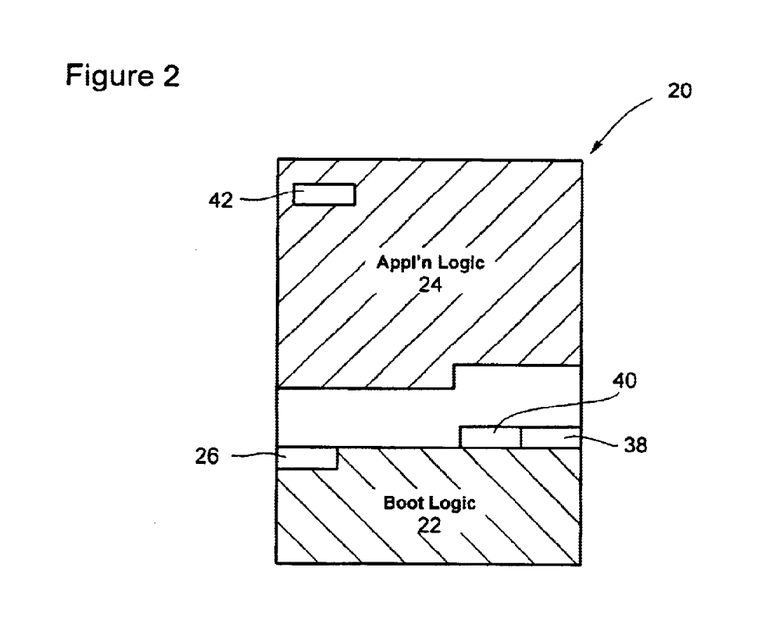
FIG. 2 is an exemplary memory map of a firmware load stored in a 32 kb memory page.

FIG. 2 schematically illustrates an exemplary firmware load 20 which is conveniently separated into a boot logic 22 and an application logic 24. The boot logic 22 comprises instructions which are executed upon initial start-up of the communication device 1, including low-level operating parameters of the communication device 1. The boot logic 22 is arranged so that its start address 24 is at a predetermined fixed start address 26, so that at start up; it can be directly accessed by the microprocessor 6. Execution of the boot logic 22 provides the microprocessor 6 with the necessary address information for continued operation. The application logic 24 comprises a plurality of programmed procedures, accessible using a high level Application Program Interface (API), for controlling the functionality of the communication device 1. Thus devices external to the communication device 1 (i.e. the host computer 12; the CO 14; etc.) can interact with the communication device 1 by means of the API. For example, a communications application (e.g. a web browser) resident in the host computer 12 can interact with the communication device 1 to establish a data connection with the network 4, and to up-load and down-load data. Similarly, the CO 14 can interact with the communication device 1 to negotiate transmission power settings, establish communication sessions, verify transmission of data packets, etc. The above-noted descriptions of the communication device 1 and firmware 20 are known, and their implementation is well understood by those skilled in the art.

Figure 3:
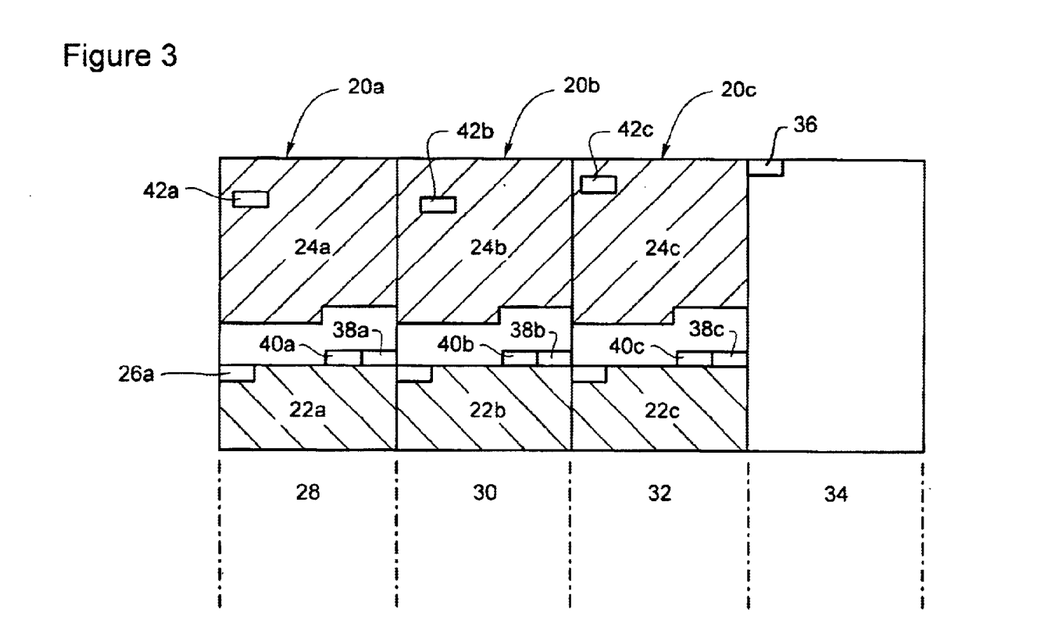
FIG. 3 is an exemplary memory map of a 128 kb FLASH memory divided into four pages.

In accordance with the present invention, the FLASH memory 8 is divided into a plurality (preferably four) of pages 28–34, which are conveniently of equal size. In the illustrated embodiment, a 128 kb FLASH memory 8 is divided into four 32 kb pages 28–34, as shown in FIG. 3. Each page is capable of storing a complete firmware load 20, and is utilized as follows:

| Page | Description |
| --- | --- |
| Boot Page (28) | Contains an original version of the firmware. |
| First Update Page (30) | Used to store an updated version of the firmware |
| Second Update Page (32) | Used to store an updated version of the firmware |
| Spare Page (34) | Used to store an Active Page flag |

As indicated above, The Boot Page 28 contains a complete original firmware load 20a, including boot logic 22a and application logic 24a. This original firmware load 20a is installed and verified at the factory during manufacture of the communication device 1, and is never modified thereafter. Accordingly, if subsequent attempts to load updated versions of the firmware fail (and also prior to receipt of any updated versions), then the communication device 1 can operate using the original firmware load 20a stored in the Boot Page 28. The start address 26a for the original boot logic 22a is predetermined, so that the microprocessor 6 can access the original boot logic 22a stored in the Boot Page 28 upon start-up. Thus start-up of the communication device 1 is always executed on the basis of the original boot logic 22a installed by the factory.

The First and Second Update Pages 30, 32 are used to store updated firmware loads 20b, 20c. As shown in FIG. 3, the First and Second Update Pages 30, 32 are the same size as the boot page 30, and thus each page 30, 32 is capable of storing a complete firmware load (boot logic 22 and application logic 24). However, as noted above, only the original boot logic 22a (stored in the Boot Page 28) is used during start-up of the communication device 1. Accordingly, updated firmware loads 20b, 20c, which are subsequently downloaded and saved into the Update Pages 30, 32, may or may not contain a boot logic 22 section, as desired.

The Spare Page 34 is preferably not used for storing firmware loads 20. Instead, the Spare Page 34 is preferably used to store an Active Page Flag 36 which acts as a pointer to the active page. In the context of the present invention, the term "active page" refers to the Update Page (either one of the First or Second Update Pages) 30, 32 of the FLASH memory 8 which contains the application logic 24 used during run-time of the communication device 1. Normally, the active page will contain the most recently updated firmware load 20. The term "inactive page" refers to the other Update Page 30, 32 which is not pointed to by the Active Page Flag. The inactive page may be empty; contain an incomplete or corrupted firmware load 20; or may contain an obsolete firmware load 20 that has been superseded by a more recently updated firmware load 20 saved in the active page. In an embodiment of the present invention, the Active Page Flag 36 is a conditional value which allows firmware logic to enable (or access) the active page. For example: if the Active Page Flag 36 is set to a value of "1", then the firmware logic determines that the active page is the first Update Page 30; otherwise (i.e. if the Active Page Flag 36 is set to any other value) the firmware logic determines that the active page is the second Update Page 32. Alternatively, the value of the Active Page Flag 36 could be a pointer to the active page (e.g. containing the page-select signal used by the microprocessor 6 to enable the desired page of the FLASH memory).

In accordance with an embodiment of the present invention, each firmware load 20 is provided with a check-sum value 38 and a jump-code 40, in addition to the boot logic 22 and application logic 24 (See FIG. 2) Both of the check-sum value 38 and the jump-code 40 are stored at respective predetermined addresses, which preferably remain unchanged in all subsequent update versions of the firmware load 20. The check-sum value 38 is used to determine the integrity of the respective firmware load 20, as will be described in greater detail below. The jump code 40 is a pointer to the start address 42 of the respective application logic 24, and will normally be unique for each version of the firmware load 20. The purpose of the jump code 40 is that, because its location is predetermined, the original version boot logic 22*a* can access the jump code 40 in the active page and thereby determine a start address 42 for the respective application logic 24, irrespective of changes to the start address 42 effected by an update of the application logic 24.

Figure 4:
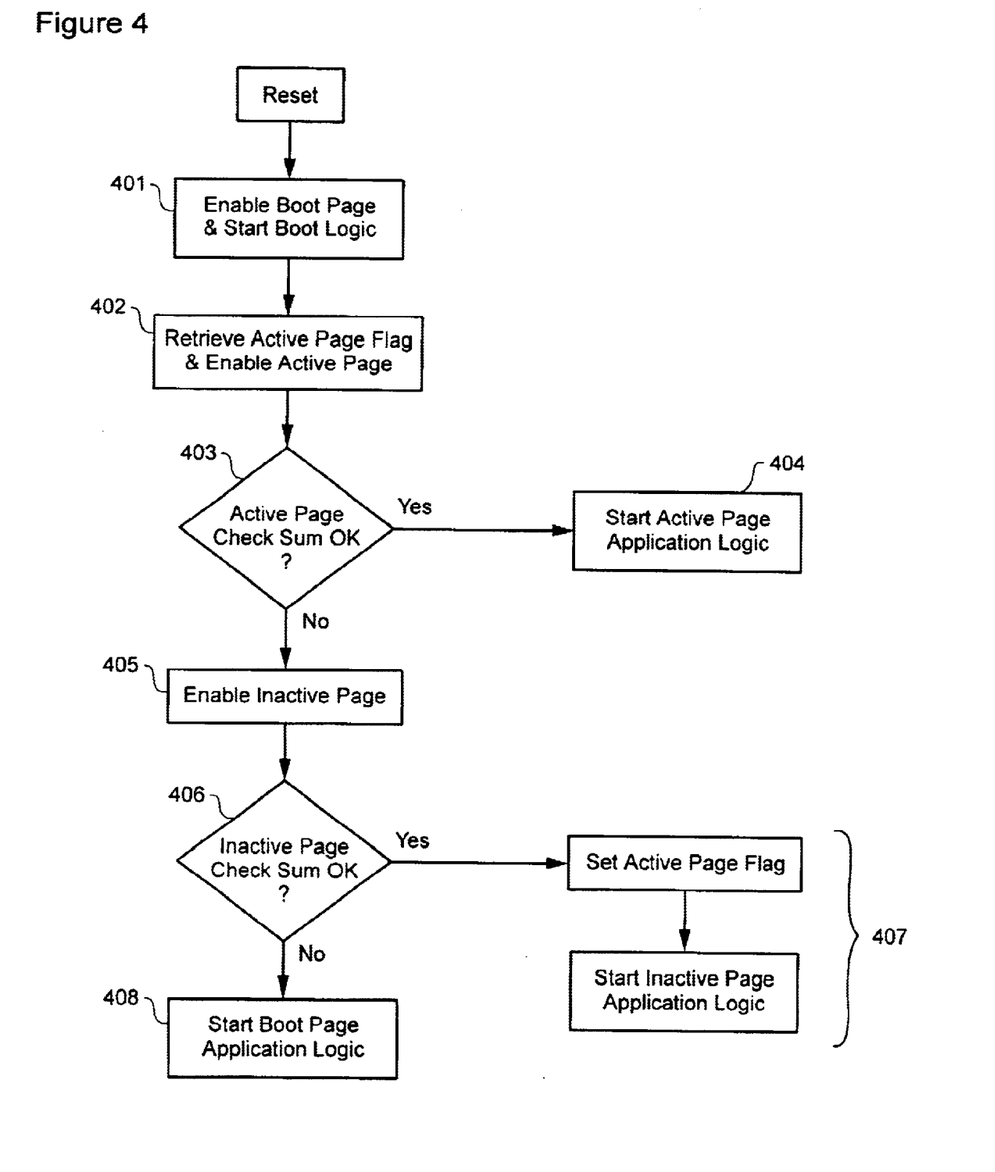
FIG. 4 is a flow chart showing the start-up processing following a (cold or warm) boot of the communication device.

FIG. 4 illustrates the method by which the original version boot logic 22*a* uses the Active Page Flag 36, check-sum 38 and jump code 40 to access, verify and begin execution of the appropriate application logic 24. The steps in the process are as follows:

401. On a reset of the communication device 1 (e.g. either a warm or cold boot), the microprocessor 6 enables the Boot Page 28 and begins execution of the original version boot logic 22*a* starting at the start address 26*a*;

402. the boot logic 22*a* retrieves the Active Page Flag 36 from the Spare Page 34 of the FLASH memory 8; identifies the active page on the basis of the Active Page Flag 36; and then causes the microprocessor 6 to enables the active page of the FLASH memory 8;

403. the check-sum value 38 of the active page is checked in a conventional manner;

404. If the active page check-sum value 38 is valid, then execution of the application logic 24 begins at the address 42 targeted by the active page jump-code 40;

405. If the active page check-sum value is invalid, then the microprocessor 6 enables the inactive page;

406. the check-sum value 38 of the inactive page is then checked in a conventional manner;

407. If the inactive page check sum value 38 is valid, then the microprocessor 6 sets the Active Page Flag 36 to point to the inactive page for future reboots (i.e. the inactive page is designated as the active page), and then execution of the application logic 24 begins at the start address 42 targeted by the jump-code 40.

408. If the inactive page check sum value 38 is invalid, then the microprocessor 6 enables the Boot Page 28 and begins execution of the boot page application logic 24*a* at the start address 42*a* targeted by the boot page jump-code 40*a*.

In addition to programmed routines for controlling communications functionality of the communication device 1, the application logic 24 in accordance with the invention includes procedures for managing the FLASH memory 8, and for writing data to the FLASH memory 8. Accessed using the API, these procedures permit the firmware 20 to be updated under the control of either the host computer 12 or through the network 4 by an update server 16 at the manufacturer's site 18 (FIG. 1). Exemplary API commands for accessing this functionality are shown in Table 1 below. It should be understood that Table 1 below is exemplary only, and is not necessarily comprehensive.

TABLE 1

| Code | Data | Argument | Description |
| --- | --- | --- | --- |
| Dnld Clr | — | — | clears the inactive page of the FLASH memory 8. |
| DnldData | addr/data | sequence # | Writes data to the FLASH memory 8 starting at an address specified by addr |
| DnldEth | — | cmd | Controls In-band download of firmware using the data channel (see detailed description below). cmd=0 : get status cmd=1 : In-band prep. cmd=2 : In-band verify cmd=3: : In-band copy cmd=4 : compare buffer to FLASH memory 8 cmd=5 : query "In-band copy done?" |
| SwapApp | — | — | Verifies contents of the inactive page and sets the Active Page Flag to point to it. |

Figure 5A:
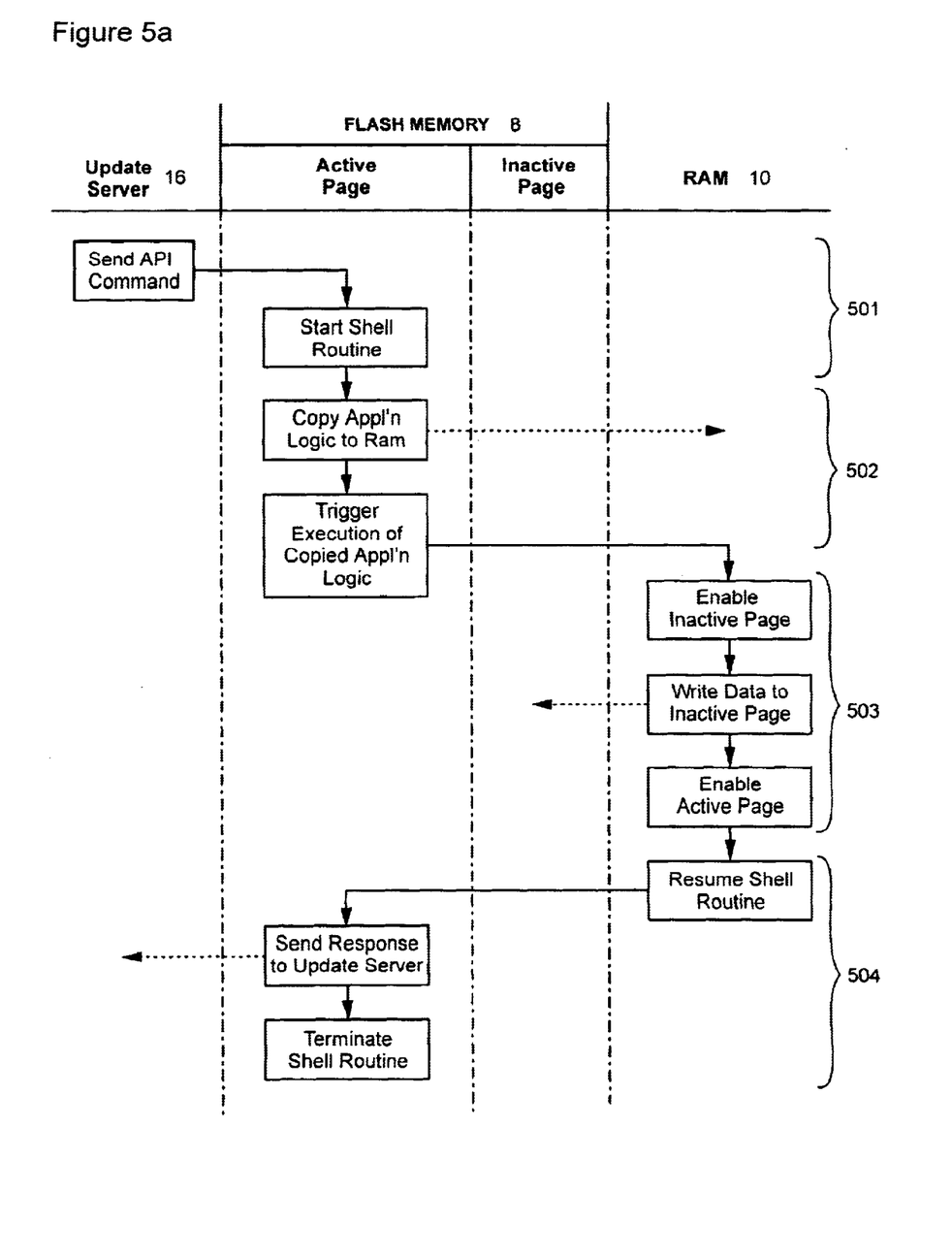
FIGS. 5a and 5b are flow charts illustrating respective alternative methods of updating firmware in accordance with the present invention.
Figure 5B:
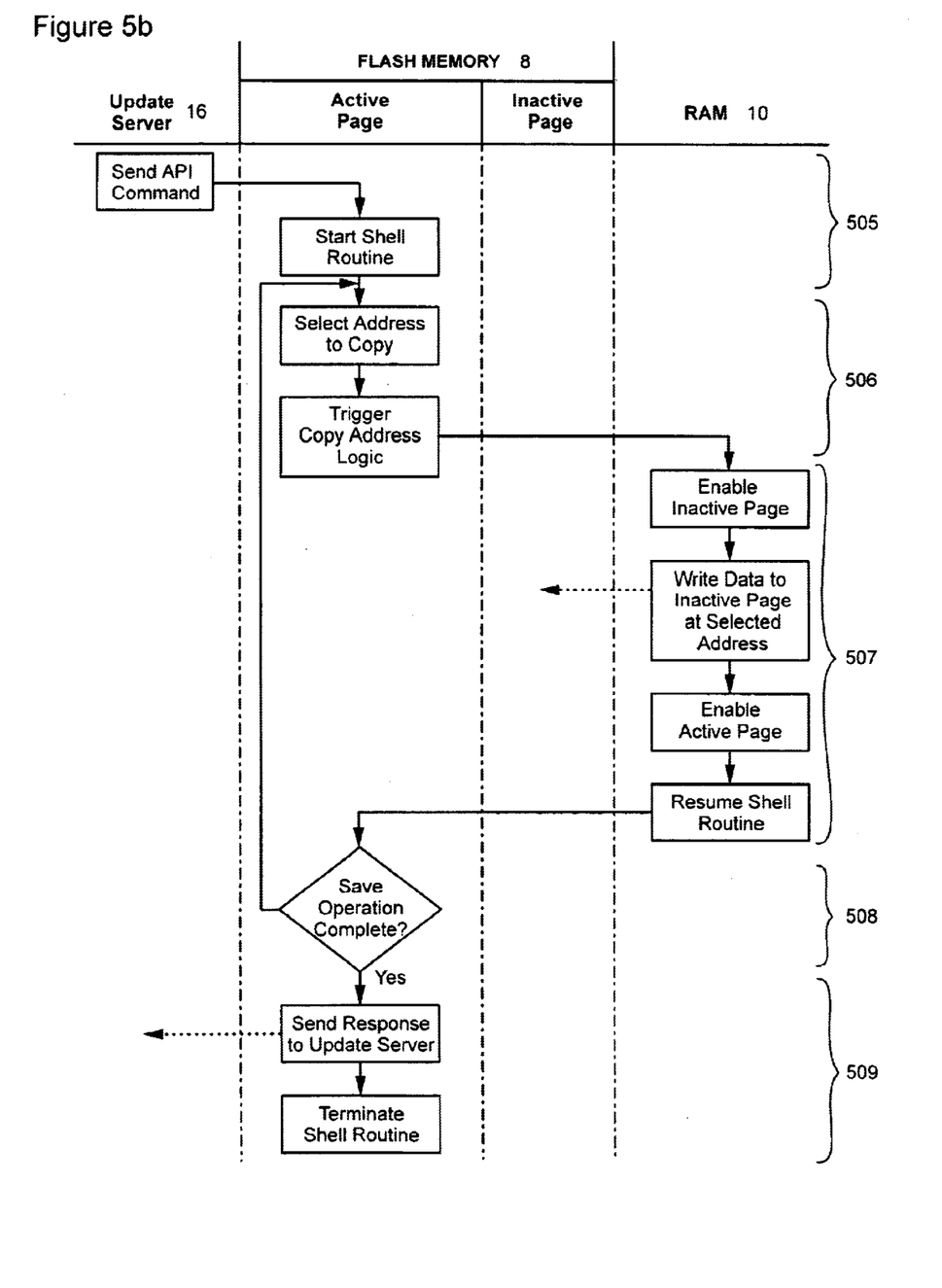

As noted above, it is not possible to change the active page or write data to the FLASH memory 8 while it is active. However, because the microprocessor 6 can only execute one command at a time, execution of any command automatically causes any other concurrent processes to be temporarily held, and process-specific state-variables stored in a buffer (conventionally provided in the microprocessor 6 for that purpose) pending completion of the command currently being executed. In accordance with the present invention, this (conventional) operation of the microprocessor 6 is exploited to enable manipulation and writing of data to the FLASH memory 8 during run-time of the application logic 24 from the FLASH memory 8. Accordingly, the invention provides a layered operational structure described below with reference to FIGS. 5*a* and 5*b*. In the embodiment illustrated in FIG. 5*a*, a block of application logic 24 is copied to RAM and executed by a shell routine. In the embodiment illustrated in FIG. 5*b*, a block of application logic 24 is copied to RAM 10 during start-up of the communication device 1, and remains resident in RAM 10 pending execution under control of the shell routine. For ease of illustration, both layer structures are illustrated in FIGS. 5*a* and 5*b* by way of example algorithms which save data to the inactive page of the FLASH memory 8. It will be understood, however, that other operations can also be performed, as desired, using the layered structure of the invention. Referring now to FIG. 5*a*, saving data to the inactive page of the FLASH memory 8 proceeds as follows:

501. Reception of an API command (e.g. from the update server 16) causes execution of a shell routine from the FLASH memory 8;

502. The shell routine copies a block of application logic 24 into RAM 10, and then triggers execution of the copied application logic. Execution of the copied application logic from RAM 10 automatically causes other ongoing processes (controlled by application logic 24 in the FLASH memory 8) to be temporarily suspended, thereby releasing the FLASH memory 8 without terminating other processes.

503. The copied application logic in RAM 10 causes the microprocessor 6 to enable the inactive page of the FLASH memory 8, performs one or more operations on the inactive page of the FLASH memory 8 (e.g. writing bytes of an updated firmware load 20); and then causes the microprocessor 6 to enable the active page of the FLASH memory 8 before terminating.

504. Termination of the copied application logic in RAM 10 returns control to the shell routine running in the FLASH memory 8, and releases the RAM 10 occupied by the copied application logic. The shell routine may issue a response to the API command, prior to terminating.

Following termination of the shell routine, suspended processes can resume on the basis of their respective state variables. The shell routine can copy the entire application logic 24 to RAM 10, or only that portion required to execute the functionality accessed by the respective API command, as desired.

FIG. 5b illustrates an alternative layered structure. In this case, a block of application logic 24 is copied into RAM 10 during start-up of the communication device 1, rather than by the shell routine. The copied block of application logic 24 remains resident in RAM 10, and is triggered by a command (possibly including one or more arguments) from the shell routine. Preferably, the copied block of application logic 24 completes a single operation step (i.e. it does not contain decision or process control logic) so that process control remains with the shell routine. This minimizes the size and run-time of the copied block of application logic 24, so that disruption of other concurrent processes (which are interrupted while the copied block of application logic 24 is running from RAM 10) is also minimized.

In the example illustrated in FIG. 5b, the copied block of application logic 24 is a "Copy-address" function which receives a target address of the FLASH memory 8 as an argument, and copies a block of data from a buffer to the inactive page of the FLASH memory 8 starting at the target address. The copied block of data may be as small as a single byte, or larger, as desired. As shown in FIG. 5b, using this alternative arrangement, saving data to the FLASH memory 8 proceeds as follows:

505. Reception of an API command (e.g. from the update server 16) causes execution of the shell routine from the FLASH memory 8;

506. The shell routine selects an address of the FLASH memory 8 to be written, and then triggers execution of the copied "Copy-address" logic, using the selected address as an argument. Execution of the "Copy-address" logic from RAM 10 automatically causes other ongoing processes (controlled by application logic 24 in the FLASH memory 8) to be temporarily suspended, thereby releasing the FLASH memory 8 without terminating other processes.

507. The "Copy-address" logic in RAM 10 causes the microprocessor 6 to enable the inactive page of the FLASH memory 8, performs one or more operations on the inactive page of the FLASH memory 8 (e.g. writing bytes of an updated firmware load to the FLASH memory 8 starting at the selected address); and then causes the microprocessor 6 to enable the active page of the FLASH memory 8 before terminating.

508. Termination of the "Copy-address" logic in RAM 10 returns control to the shell routine running in the FLASH memory 8, while leaving the "Copy-address" logic resident in the RAM 10 for future use. The shell routine then determines if the a operation is complete.

509. If the result of the check at step 508 above is "YES", the shell routine may issue a response to the API command, prior to terminating. Alternatively, if the result of the check at step 508 above is "NO", the shell routine loops back to select a new address and re-trigger the "Copy-address" logic.

Using the layered structure as described above with reference to FIGS. 5a and 5b, updated firmware loads can be downloaded and to the communication device 1 and saved in the inactive page of the FLASH memory 8 according to two modes, as described below. In the following two examples, the layered structure of FIG. 5a is used. It will be understood, however, that the same modes of operation can equally be implemented using the layered structure of FIG. 5b.

Mode 1: In-band Download

Figure 6A:
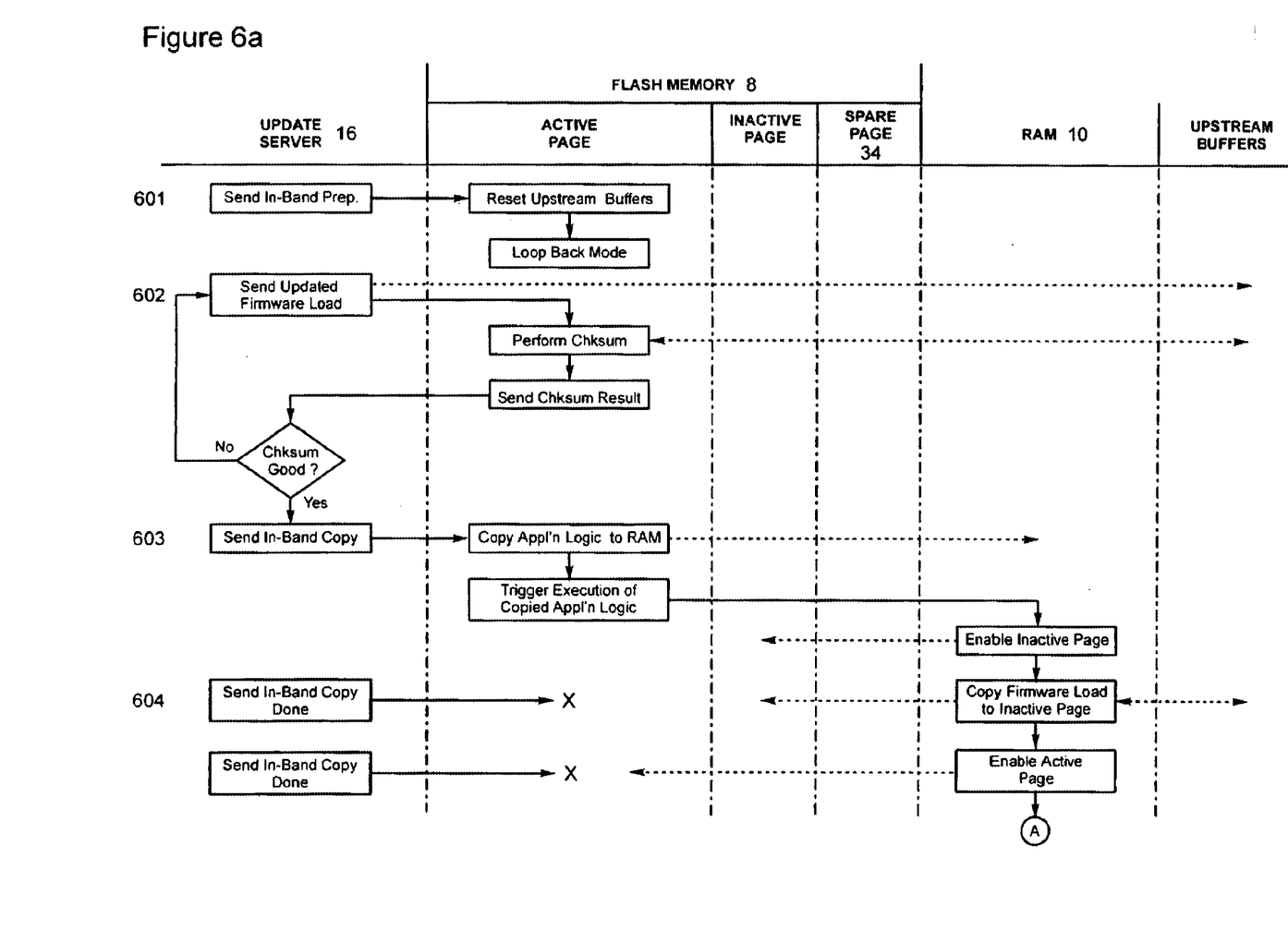
FIGS. 6a–6b are a flow chart illustrating In-band download of a firmware load in accordance with an embodiment of the present invention.
Figure 6B:
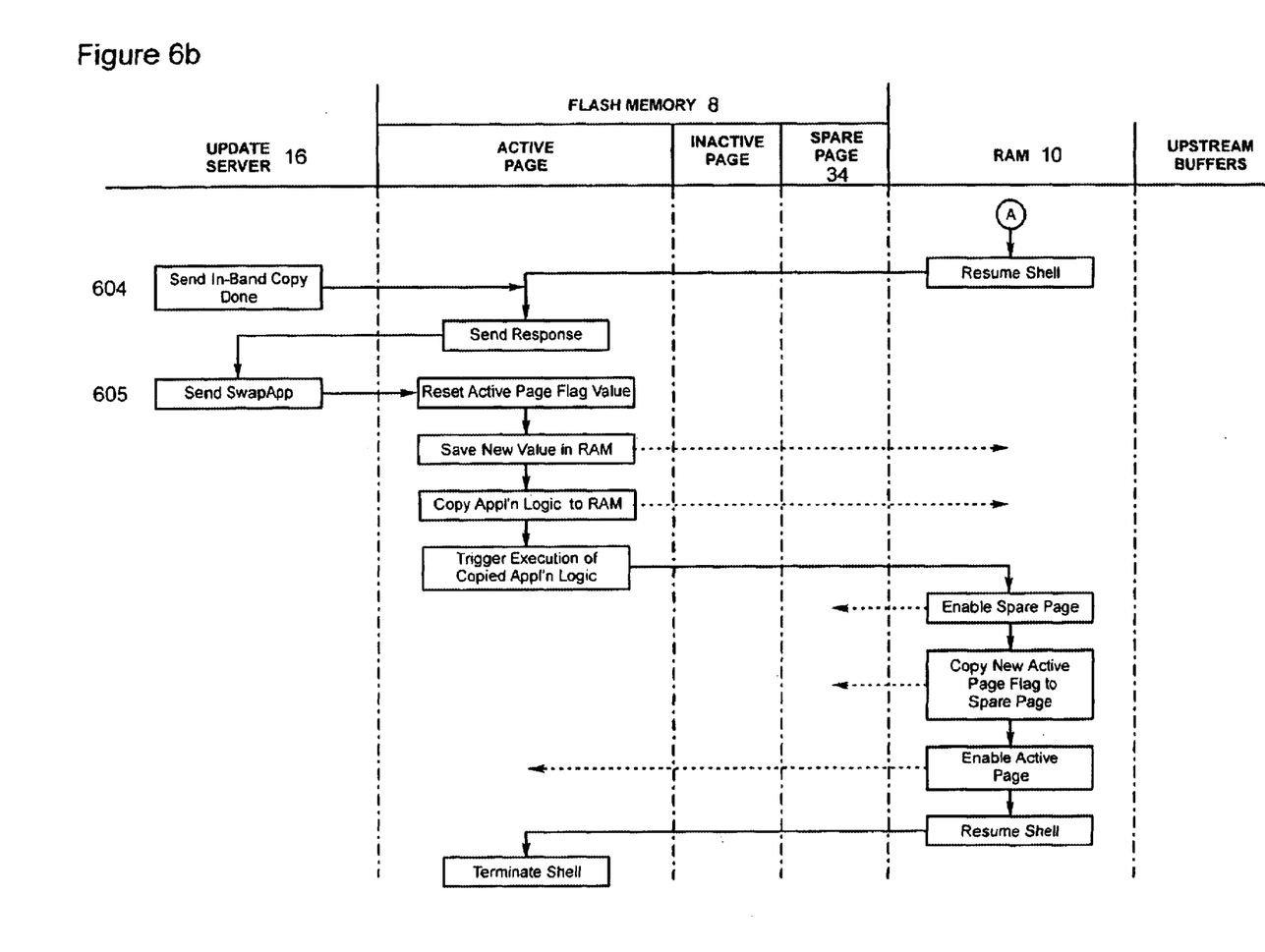

In-band download utilises a data-channel of the communication device 1 to receive the updated firmware load 20. The updated firmware load 20 is stored in a buffer of the communication device 1 pending copying of the updated firmware load 20 to the FLASH memory. Referring to FIGS. 6a–6b, In-band download proceeds as follows:

601 The update server 16 transmits an In-band Prep. (DnldEth, cmd=1) message to the communication device 1 using the communication device's messaging channel. In response to the In-band Prep. message, the communication device 1 resets the upstream buffers and enters a loop-back mode.

602 The update server 16 then transmits the updated firmware load 20 over the data-channel, which is received and saved in the communication device's upstream buffer. On receipt of the firmware load 20, the communication device 1 performs a check-sum operation on the firmware load to verify correct transmission, and transmits the result to the update server 16.

603 If the result of the check-sum operation is correct, the update server 16 transmits an In-Band Copy-to-FLASH command (DnldEth, cmd=3) over the communication device's message channel. This causes a shell routine to copy a block of Application logic 24 to the RAM and then trigger execution of the copied application logic 24. The copied application logic causes the microprocessor to enable the inactive page of the FLASH memory 8; then copies the updated firmware load 20 from the upstream buffer and into the inactive page; and finally re-enables the active page before returning control to the shell routine and terminating.

604 While In-Band Copy operation (step 603) is in progress, the update server 16 periodically (e.g. every 2–3 seconds) sends an "In-band Copy Done query" (DnldEth, cmd=5) to the communication device 1. However, since the copied application logic 24 running in the RAM is not responsive to this query (because it only contains logic for copying data from the upstream buffers to the inactive page), no response to the query is returned to the update server 16 until the In-Band Copy operation is completed and the active page of the FLASH memory 8 is re-enabled. Control then returns to the application logic 24 running in the FLASH memory 8. At this point, the "In-band Copy Done query" (DnldEth, cmd=5) is acknowledged by returning the query to the update server 16, which notifies the update server 16 that the copy operation has been completed.

605 The update server 16 then transmits a "SwapApp" command, which causes the communication device 1 to set the Active Page Flag 36 to point to the just updated inactive page, so that on a future re-boot of the communication device 1 the boot logic 22a will start the application logic 24 of the updated firmware load 20. In an embodiment of the invention, the "SwapApp" command can also trigger a re-boot of the communication device 1.

In-Band download facilitates a very rapid transmission of an updated firmware load to the communication device 1. For example, a 20 kb firmware load can be transmitted to the communication device 1 in as little as 0.17 sec. This makes transmitting an updated firmware load 20 rapid and convenient for the manufacturer. However, copying the updated firmware load to FLASH memory 8 is expected to take significantly longer (a 32 kb load can require as much as 15 seconds to copy). Because data channel and the upstream buffers are used to transfer the updated firmware load 20, the communication device 1 must first enter a loop-back mode, which necessarily interrupts other data traffic. The communication device 1 cannot be returned to normal operation until the copy operation is completed, so an associated interruption in communications may be experienced by the user.

Mode 2: Out of Band Download

Figure 7A:
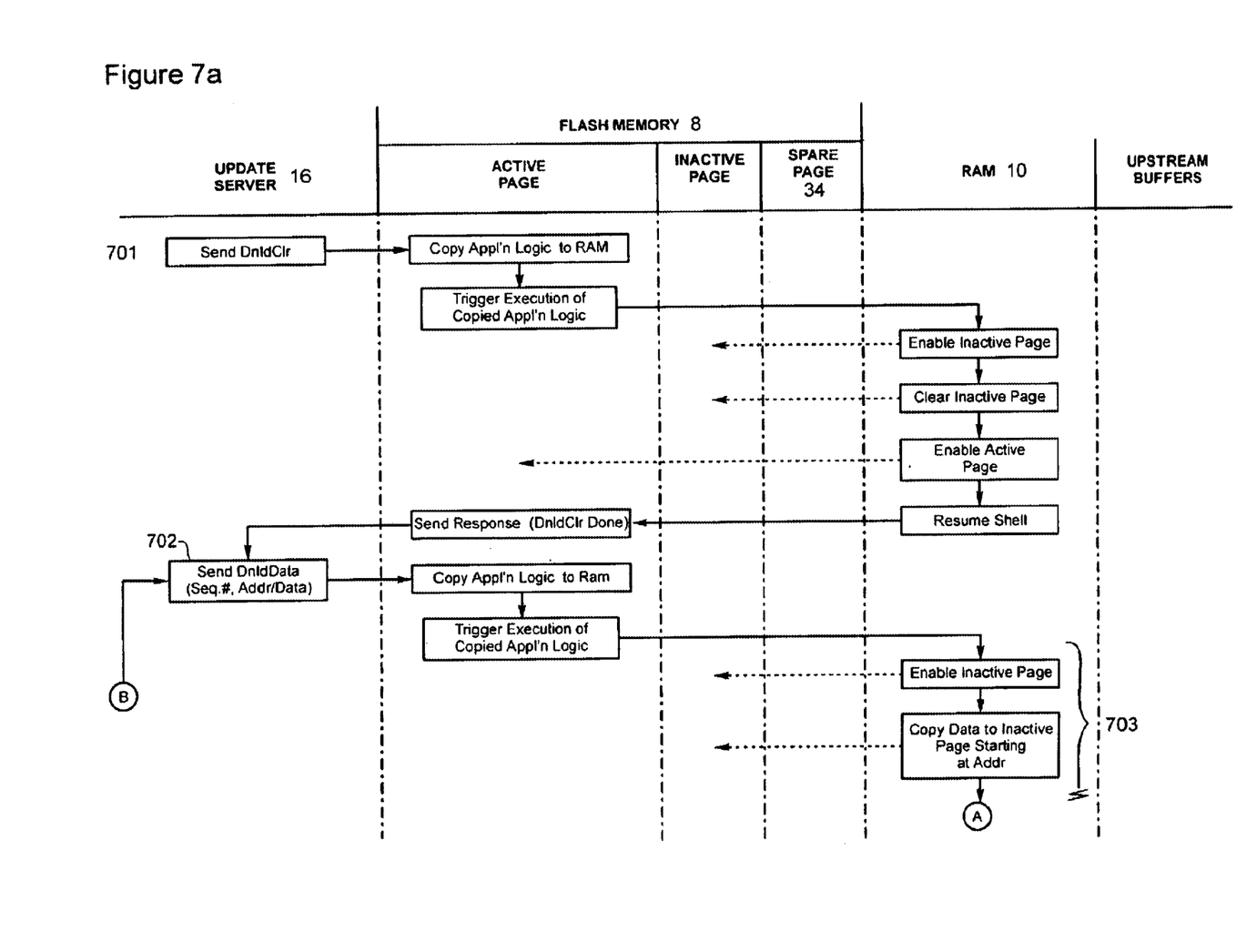
FIGS. 7a–7c show a flow chart illustrating Out-of-Band download of a firmware load in accordance with an embodiment of the present invention.
Figure 7B:
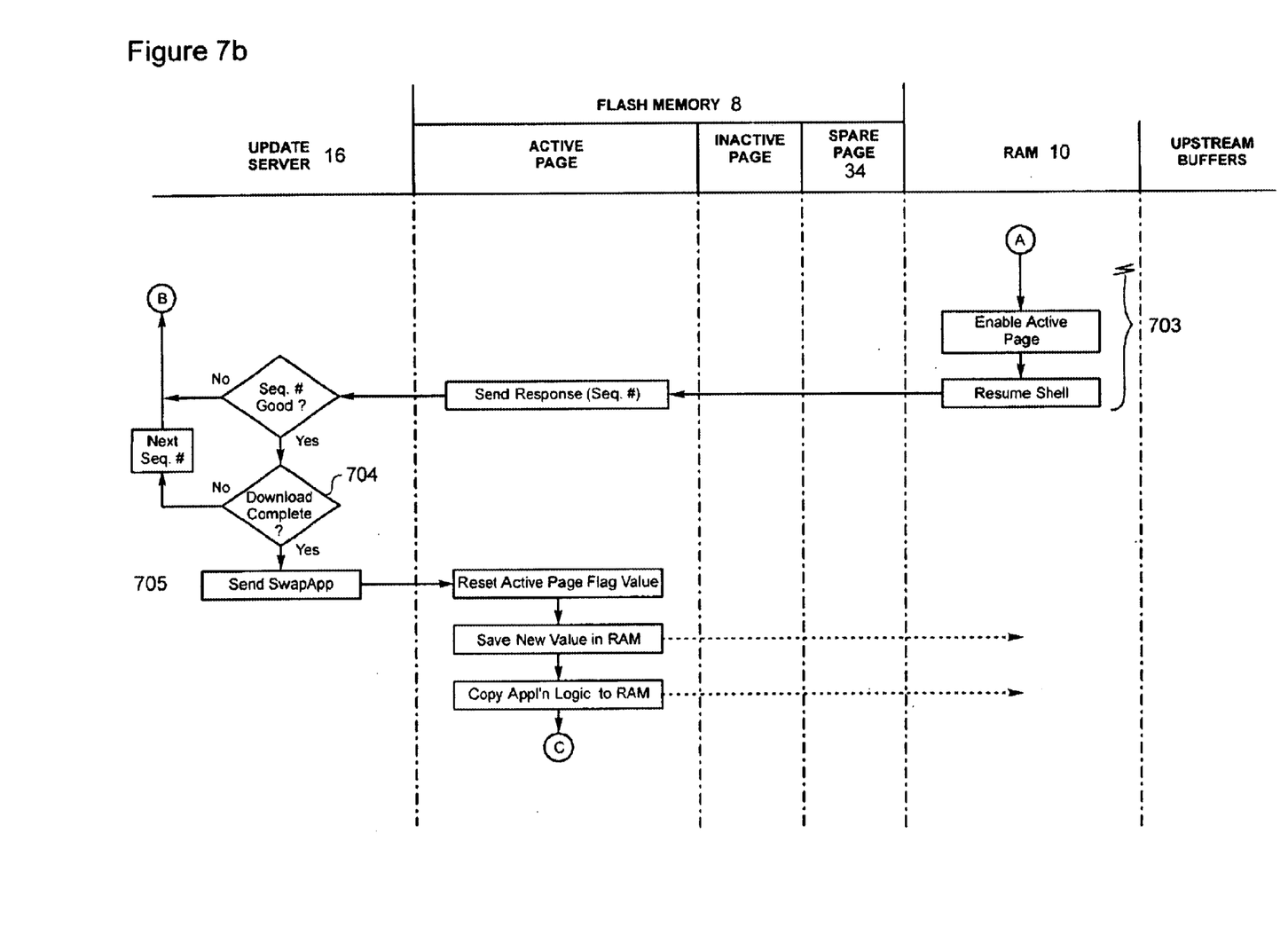
Figure 7C:
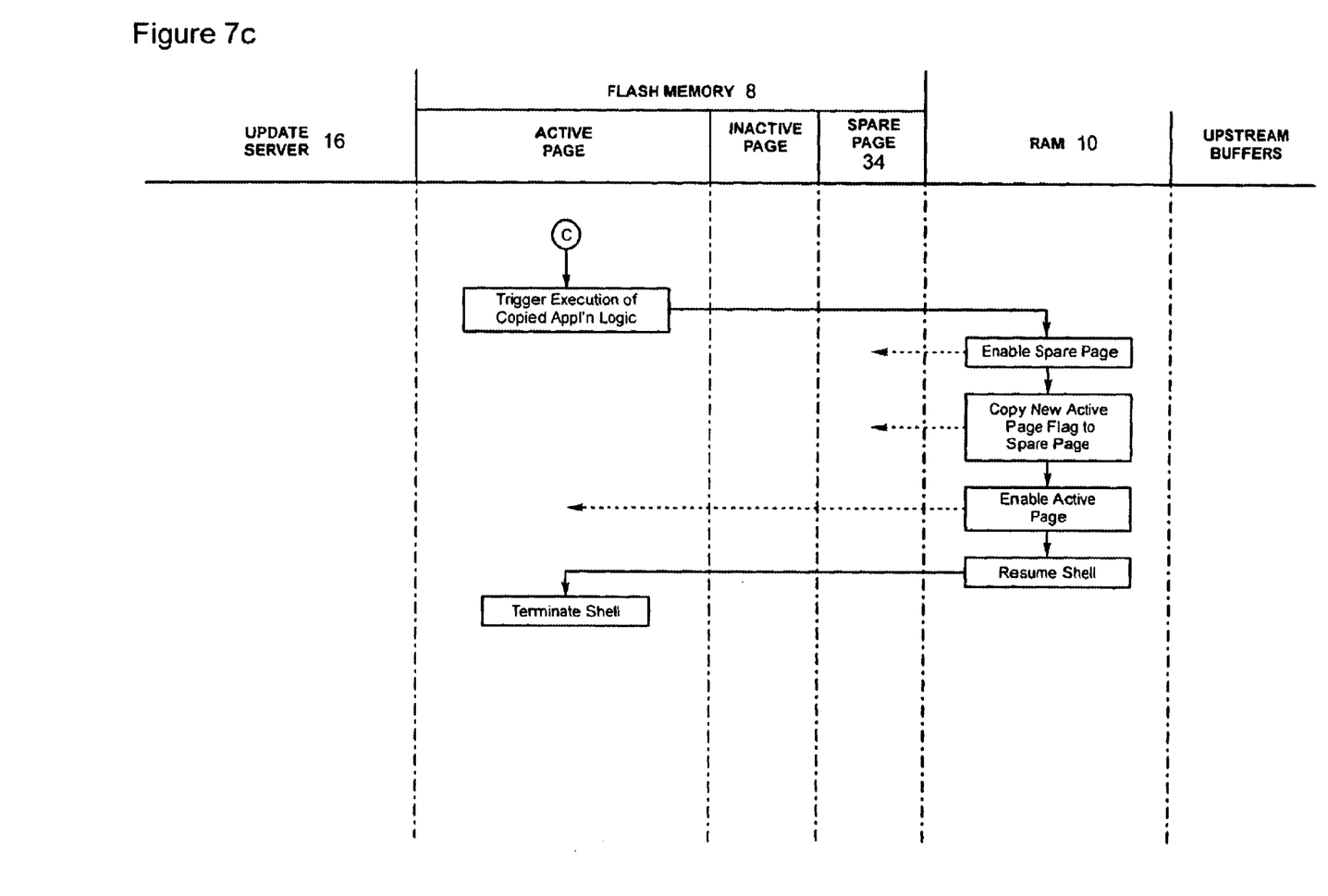

Out of Band download utilises the communication device 1's message-channel and buffers to download the updated firmware load. Referring to FIGS. 7a–7c, Out of band download proceeds as follows:

701. The update server 16 transmits an "DnldClr" message to the communication device 1 using the communication device's messaging channel. In response to the "DnldClr" message, the communication device 1 starts a shell routine which copies a block of application logic 24 to the RAM 10 and triggers execution of the copied application logic from the RAM 10. The copied application logic causes the microprocessor 6 to enable the inactive page of the FLASH memory 8; initializes the inactive page of the FLASH memory 8 by writing a constant value (e.g. "0") into all locations of the inactive page; and then returns control to the shell routine before terminating.

702. The update server 16 then transmits a "DnldData" command over the message-channel which contains a sequence number, a start address, and at least a portion of an updated firmware load 20 as arguments.

703. On receipt of the "DnldData" command, the communication device 1 starts a shell routine which copies a block of application logic 24 to the RAM 10 and triggers execution of the copied application logic from the RAM 10. The copied application logic causes the microprocessor 6 to enable the inactive page of the FLASH memory 8; copies the bytes of the updated firmware load 20 included in the DnldData command into the inactive page of the FLASH memory 8 sequentially starting at the specified start address; and then returns control to the shell routine before terminating. The sequence number is not used as part of the save operation, but rather is. passed back to the update server 16 by the shell routine as an argument in an acknowledgement message. When the acknowledgement (and sequence number) are received by the update server 16, the server is informed that the transmitted portion of the updated firmware load 20 was received correctly. At this point a further portion of the updated firmware load 20 can be transmitted by the update server 16 with the same sequence number or a new one. If the sequence number is not received by the update server 16, or it is received indicating an error condition, then the update server 16 retransmits the relevant portion of the updated firmware load 20 attached to a new "DnldData" command.

704. Steps 702 and 703 are repeated until the entire updated firmware load 20 has been correctly transmitted to the communication device 1 and saved in the FLASH memory 8.

705. Once the download process (steps 702–704) is completed, the update server 16 sends a "SwapApp" command, which causes the communication device 1 to set the Active Page Flag 38 to point to the inactive page (in which the updated firmware load is saved), so that on a future re-boot of the communication device 1 the boot logic 22a will access and start the application logic 24 of the updated firmware load 20. As noted above, the "SwapApp" command may also trigger re-boot of the communication device 1.

Out of-Band download is significantly slower than In-band download, because an updated firmware load must be broken up into small blocks which are transmitted individually. This is due to limitations in the size of the message channel buffer in the communication device 1 (typically 512 bytes). This slows down and complicates the transmission of the updated firmware load 20, because the update server must continuously monitor the status of the download. Additionally, the risk of an incomplete download is increased because it is possible that a user of the host computer 12 may power down the communication device 1 before the download is complete. However, because the message channel is used for the download, this process can be conducted simultaneously with data traffic of user-initiated communication sessions, and thus it is possible for the entire download operation to be completed without inconveniencing the user.

The risk of partial downloads can be managed by maintaining a database of each communication device 1 and a respective current download status. If such a database is maintained, each block of the updated firmware load 20 is assigned a unique sequence number used for the respective "DnldData" command, so that the download status for each communication device 1 may be tracked by the sequence number of the latest successfully completed "DnldData" command. As each acknowledgement message is received by the update server 16. (step 703), the database is updated with the sequence number of the latest successfully completed "DnldData" command. If the communication device 1 goes "off-line" or is powered down before the download is complete, then transmission of "DnldData" commands to the communication device 1 is terminated. When the communication device 1 becomes available at a later time, transmission of "DnldData" commands to the communication device 1 is resumed starting at the sequence number indicated in the database.

The embodiments of the invention described above are intended to be exemplary only. Changes and modifications will no doubt become apparent to those of skill in the art. The scope of the invention is therefore intended to be limited solely by the scope of the appended claims.

I claim:

1. A method of remotely updating firmware saved in a FLASH memory of a communication device connected to a network, the method comprising steps of:
   a) providing a boot page of the FLASH memory for storing a first firmware load;
   b) providing a pair of update pages of the FLASH memory, each update page being adapted to store a respective firmware load;

c) designating one of the update pages as an active update page, and the other one of the update pages as an active update page;

d) transmitting an updated firmware load through the network to the communication device;

e) storing, under control of the first firmware load, the updated firmware load in the inactive update page of the FLASH memory; and f) rebooting the communication device under control of the first firmware load, including steps of:
  i) dynamically identifying, from among the firmware loads stored in the FLASH memory, a most recently stored valid firmware load; and
  ii) continuing operation of the communication device under control of the identified most recently stored valid firmware load.

2. A method as claimed in claim 1, wherein an entire updated firmware load is transmitted in a single download operation using a data channel of the communication device, and temporarily stored in an upstream buffer of the communication device.

3. A method as claimed in claimed 2, further comprising a step of placing the communication device into a loop-back mode prior to transmitting the updated firmware load.

4. A method as claimed in claim 1, further comprising a step of preliminarily dividing the updated firmware load into a plurality of predetermined load portions.

5. A method as claimed in claim 4, wherein each load portion is transmitted in a respective download operation using a message channel of the communication device.

6. A method as claimed in claim 5, wherein in each download operation comprises transmitting a DnldData command including an address and the load portion as arguments.

7. A method as claimed in claim 6, further comprising a step of saving the load portion in the FLASH memory starting at an address of the FLASH memory corresponding to the address included in the DnldData command.

8. A method as claimed in claim 4, further comprising a step of determining whether or not the load portion has been correctly saved in the FLASH memory.

9. A method as claimed in claim 8, wherein when the load portion has been correctly saved in the FLASH memory, transmitting another load portion to the communication device, and when the load portion has not been correctly saved in the FLASH memory, re-transmitting the load portion to the communication device.

10. A method as claimed in claim 4, further comprising monitoring a download status of the updated firmware load to the communication device.

11. A method as claimed in claim 10, wherein monitoring the download status comprises maintaining a database including a sequence number of a load portion correctly saved in the FLASH memory and incrementing the sequence number as each successive load portion is correctly saved in the FLASH memory.

12. A method as claimed in claim 1, wherein the step of saving the updated firmware load in the inactive update page comprises a step of determining whether or not a complete updated firmware load has been successfully saved in the inactive update page.

13. A method as claimed in claim 12, further comprising, when the updated firmware load has been successfully saved in the inactive update page, a step of modifying an active page flag to point to the inactive page, such that the inactive page will become the active page upon a subsequent re-boot of the communication device.

14. A method as claimed in claim 1, wherein the step of dynamically identifying a most recently stored valid firmware load comprises steps of:
  a) accessing the active update page to determine the presence of a valid firmware load; and
  b) if a valid firmware load is not located in the active update page, accessing the inactive update page to determine the presence of a valid firmware load.

15. A method as claimed in claim 14, wherein, if a valid firmware load is located in the active update page, the step of continuing operation of the communication device under control of the identified most recently stored valid firmware load comprises a step of continuing operation of the communication device under control of the firmware load in the active update page.

16. A method as claimed in claim 14, wherein, if a valid firmware load is located in the inactive update page, the step of continuing operation of the communication device under control of the identified most recently stored valid firmware load comprises steps of:
  a) continuing operation of the communication device under control of the firmware load in the inactive update page; and
  b) modifying an active page flag to point to the inactive update page, whereby the inactive update page will become the active update page upon a subsequent re-boot of the communication device.

17. A method as claimed in claim 14, wherein, if a valid firmware load is not located in the either the active of inactive update pages, the step of continuing operation of the communication device under control of the identified most recently stored valid firmware load comprises a step of continuing operation of the communication device under control of the first firmware load in the boot page.

18. A system for remotely updating firmware saved in a FLASH memory of a communication device connected to a network, the system comprising:
  a) a boot page of the FLASH memory for storing a first firmware load;
  b) a pair of update pages of the FLASH memory, each update page being adapted to store a respective firmware load, one of the update pages being designated as an active update page, and the other one of the update pages as an inactive update page;
  c) a server operatively connected to the network and adapted for transmitting an updated firmware load through the network to the communication device; and
  d) a microprocessor operative to:
    i) store, under control of the first firmware load, the updated firmware load in the inactive update page of the FLASH memory; and
    ii) reboot the communication device under control of the first firmware load, including steps of:
      dynamically identifying, from among the firmware loads stored in the FLASH memory, a most recently stored valid firmware load; and
      continuing operation of the communication device under control of the identified most recently stored valid firmware load.

19. A system as claimed in claim 18, wherein the first firmware load includes a boot logic adapted to control operation of the microprocessor during a start-up of the communication device.

20. A system as claimed in claim 18, wherein the server is adapted to transmit an entire updated firmware load in a single download operation using a data channel of the communication device.

21. A system as claimed in claim 20, wherein the microprocessor is operative under control of the first firmware load to place the communication device into a loop-back mode in response to a message transmitted by the server.

22. A system as claimed in claim 18, wherein the server is adapted to preliminarily divide the updated firmware load into a plurality of predetermined load portions.

23. A system as claimed in claim 22, wherein the server is adapted to transmit each load portion in a respective download operation using a message channel of the communication device.

24. A system as claimed in claim 23, wherein the server is adapted to transmit a DnldData command including an address and the load portion as arguments during each download operation.

25. A system as claimed in claim 24, wherein the microprocessor is operative under control of the copied portion of the first firmware load to save the load portion in the FLASH memory starting at an address of the FLASH memory corresponding to the address included in the DnldData command.

26. A system as claimed in claim 22, further comprising means for monitoring a download status of the updated firmware load to the communication device.

27. A system as claimed in claim 26, wherein the means for monitoring a download status of the updated firmware load to the communication device comprises:
   a) a respective sequence number associated with each load portion transmitted by the server;
   b) a database including, in respect of the communication device, the sequence number corresponding to a load portion correctly saved in the FLASH memory;
   c) means for determining whether or not the load portion transmitted by the server has been correctly saved in the FLASH memory; and
   d) means for updating the database as each successive load portion is correctly saved in the FLASH memory.

28. A system as claimed in claim 27, wherein the database is stored on the server.

29. A system as claimed in claim 18, wherein the microprocessor is operative under control of the first firmware load to save the updated firmware load in the inactive page.

30. A system as claimed in claim 29, wherein the microprocessor is operative under control of the first firmware load to modify the active page flag to point to the inactive update page in response to a message transmitted by the server, whereby the inactive update page will become the active update page upon a subsequent re boot of the communication device.

31. A system as claimed in claim 18, wherein the microprocessor is operative under control of the first firmware load to dynamically identify a most recently stored valid firmware load by:
   a) accessing the active update page to determine the presence of a valid firmware load; and
   b) if a valid firmware load is not located in the active update page, accessing the inactive update page to determine the presence of a valid firmware load.

32. A system as claimed in claim 18, wherein, if a valid firmware load is located in the active update page, the microprocessor is operative under control of the first firmware load to continue operation of the communication device under control of the firmware load in the active update page.

33. A system as claimed in claim 18, wherein, if a valid firmware load is located in the inactive update page, the microprocessor is operative under control of the first firmware load to:
   a) modify an active page flag to point to the inactive update page, whereby the inactive update page will become the active update page upon a subsequent re-boot of the communication device; and
   b) continue operation of the communication device under control of the firmware load in the inactive update page.

34. A system as claimed in claim 18, wherein, if a valid firmware load is not located in the either the active of inactive update pages, the microprocessor is operative under control of the first firmware load to continue operation of the communication device under control of the first firmware load in the boot page.

35. A communication device connected to a network and operative in accordance with firmware saved in a FLASH memory, the communication device comprising:
   a) a boot page of the FLASH memory for storing a first firmware load;
   b) a pair of update pages of the FLASH memory, each update page being adapted to store a respective firmware load, one of the update pages being designated as an active update page, and the other one of the update pages as an inactive update page;
   c) a buffer for receiving an updated firmware load through the network; and
   d) a microprocessor operative to:
      i) store, under control of the first firmware load, the updated firmware load in the inactive update page of the FLASH memory; and
      ii) reboot the communication device under control of the first firmware load, including steps of:
         dynamically identifying, from among the firmware loads stored in the FLASH memory, a most recently stored valid firmware load; and
         continuing operation of the communication device under control of the identified most recently stored valid firmware load.

36. A communication device as claimed in claim 35, wherein the first firmware load includes a boot logic adapted to control operation of the microprocessor during a start-up of the communication device.

37. A communication device as claimed in claim 35, wherein the communication device is adapted to receive an entire updated firmware load in a single download operation using a data channel of the communication device.

38. A communication device as claimed in claim 37, wherein the microprocessor is operative under control of the first firmware load to place the communication device into a loop-back mode in response to a message transmitted by the server.

39. A communication device as claimed in claim 35, wherein the updated firmware load is preliminarily divided into a plurality of predetermined load portions, and the communication device is adapted to receive each load portion in a respective download operation using a message channel of the communication device.

40. A communication device as claimed in claim 39, wherein each download operation comprises receiving a DnldData command including an address and the load portion as arguments, and the microprocessor is operative under control of the copied portion of the first firmware load to save the load portion in the FLASH memory starting at an address of the FLASH memory corresponding to the address included in the DnldData command.

41. A communication device as claimed in claim 35, wherein the microprocessor is operative under control of the first firmware load to save the updated firmware load in the inactive page.

42. A communication device as claimed in claim 41, wherein the microprocessor is operative under control of the first firmware load to modify the active page flag to point to the inactive update page, whereby the inactive update page will become the active update page upon a subsequent reboot of the communication device.

43. A communication device as claimed in claim 35, wherein the microprocessor is operative under control of the first firmware load to dynamically identifying a most recently stored valid firmware load by:

a) accessing the active update page to determine the presence of a valid firmware load; and b) if a valid firmware load is not located in the active update page, accessing the inactive update page to determine the presence of a valid firmware load.

44. A communication device as claimed in claim 35, wherein, if a valid firmware load is located in the active update page, the microprocessor is operative under control of the first firmware load to continue operation of the communication device under control of the firmware load in the active update page.

45. A communication device as claimed in claim 35, wherein, if a valid firmware load is located in the inactive update page, the microprocessor is operative under control of the first firmware load to:

a) modify an active page flag to point to the inactive flit update page, whereby the inactive update page will become the active update page upon a subsequent re-boot of the communication device; and b) continue operation of the communication device under control of the firmware load in the inactive update page.

46. A communication device as claimed in claim 35, wherein, if a valid firmware load is not located in either the active of inactive update pages, the microprocessor is operative under control of the first firmware load to continue operation of the communication device under control of the first firmware load in the boot page.

* * * * *